United States Patent [19]

Hulth

[11] Patent Number: 4,912,725
[45] Date of Patent: Mar. 27, 1990

[54] ADAPTIVE EQUALIZER INCLUDED IN THE RECEIVER FOR A DATA TRANSMISSION SYSTEM

[75] Inventor: Maria T. V. Hulth, Bandhagen, Sweden

[73] Assignee: Telefonaktiebolaget L M Ericsson, Stockholm, Sweden

[21] Appl. No.: 251,552

[22] Filed: Sep. 30, 1988

[30] Foreign Application Priority Data

Oct. 23, 1987 [SE] Sweden .................. 8704135

[51] Int. Cl.$^4$ ............................................. H04B 3/06
[52] U.S. Cl. ............................................ 375/14; 375/98
[58] Field of Search ............... 364/724.2; 379/398; 367/44; 375/11, 12, 14, 98; 333/18, 28

[56] References Cited

U.S. PATENT DOCUMENTS

| 3,792,356 | 2/1974 | Kobayashi et al. | 375/14 |
| 4,158,232 | 6/1979 | Koeth et al. | 364/724.2 |
| 4,247,940 | 1/1981 | Mueller et al. | 375/14 |
| 4,283,788 | 8/1981 | Tamburelli | 375/14 |
| 4,288,872 | 9/1981 | Tamburelli | 375/14 |
| 4,477,914 | 10/1984 | Murray et al. | 375/14 |
| 4,547,888 | 10/1985 | Ryan et al. | 375/14 |

FOREIGN PATENT DOCUMENTS

| 48475 | 3/1982 | European Pat. Off. |
| 2621685 | 12/1977 | Fed. Rep. of Germany |
| 415854 | 7/1978 | Sweden |

Primary Examiner—Benedict V. Safourek
Attorney, Agent, or Firm—Burns, Doane, Swecker & Mathis

[57] ABSTRACT

An adaptive equalizer is included in a receiver in a data transmission system. The equalizer is primarily intended for equalizing incoming, sampled signals, which are recoded on the transmission side of the system according to a quaternary code, e.g. a so-called "2B1Q" code. Already known equalizers contain two digital filters (F1, F2) and a decision circuit (B). One filter (F1) smooths out the precursors and the other (F2) the postcursors. According to the invention, the first filter (F1) comprises a digital filter with only one tap for eliminating the dominant precursor ($h_{-1}$).

2 Claims, 2 Drawing Sheets

ADAPTIVE EQUALIZER INCLUDED IN THE RECEIVER FOR A DATA TRANSMISSION SYSTEM

TECHNICAL FIELD

The present invention relates to an adaptive equalizer according to the preamble of claim 1, for achieving a more simple and improved equalization of the so-called precursors and postcursors of a signal received from a transmission medium after the received signal has been sampled at a given sampling frequency.

BACKGROUND ART

In transmission technology, adaptive equalizers are used to suppress the effect of analogue transmission media on transmitted signals that are recoded from their digital to the corresponding analogue form. A conversion takes place on the transmission side of the transmission system according to a given code, e.g. biphase, HDB3 etc, to adjust the signal flow to the medium. On the receiver side, recoding to the original digital form therefore takes place. The analogue signal will be distorted and delayed, due to imperfections in the medium.

It is known to transmit the data symbols on the transmitter side according to the so-called 2B1Q code. This involves zeros and ones in a data flow being recoded in pairs, e.g. so that 00 is recoded to a pulse having a given amplitude, 01 to a pulse having another amplitude etc. In addition, the pulses are transmitted such that a pulse following on a pulse is started before the former is terminated, i.e. there is an overlapping pulse flow. On the receiver side, this gives rise to a received signal, the remote signal, which comprises a main pulse preceded by a plurality of "precursors" and followed by negative and positive "postcursors", which affect subsequently received remote signal pulses.

For eliminating, or at least suppressing these precursors and postcursors it has been proposed in the prior art to use equalizers, where these include first and second digital filters, the first filter equalizing the precursors, and the second filter the postcursors, e.g. as described in "Adaptive Equalization", Proceedings of the IEEE, Vol. 73, No 9, September 1985, p. 1357.

DISCLOSURE OF THE INVENTION

In data transmission by the so-called 2B1Q method there is simultaneous recoding of two bits (00, 01, 10, 11) at a time, four different levels being formed, i.e. a so-called quaternary code. A new 2B1Q pulse is furthermore sent before a preceding such pulse has ended. According to what has been said hereinbefore, this gives rise to one or more precursors (precursors part) and a plurality of postcursors (postcursors part).

The above-mentioned known equalizer having two filters for smoothing out both parts can be expensive, since the first filter will have a plurality of taps for equalizing the precursors. It will thus be difficult to implement, since several taps cause the sampling rate to increase for enabling the filter to converge. In addition, there is also a desire to retain a sampling rate which is equal to the baud rate, i.e. equal to the speed of the transmitted pulses. Such a sampling rate results in that the filters do not reliably converge within practical limits for different kinds of transmission media, however.

The equalizer in accordance with the present invention contains a first and second filter for smoothing out the respective precursors and postcursors, occurring in the use of overlapping multilevel codes, e.g. a 2B1Q code. However, the inventive equalizer is limited to the case where solely one precursor of importance occurs before the main pulse, which is to be detected on the receiver side, while the remaining precursors are negligible. The equalizer is thus disposed for use in connection with transmissions using the types of code mentioned hereinbefore.

The object of the present invention is thus to achieve an equalizer with two adaptive filters for smoothing out the precursor part and the postcursors part, respectively, where the filter for the precursor part has been simplified according to the character of the transmission code used.

To this end the equalizer has been given the distinguishing features disclosed in the characterizing portion of claim 1.

BRIEF DESCRIPTION OF DRAWING

The invention will now be described in more detail, with reference to the drawing, where.

BEST MODE FOR CARRYING OUT THE INVENTION

Figure 1:
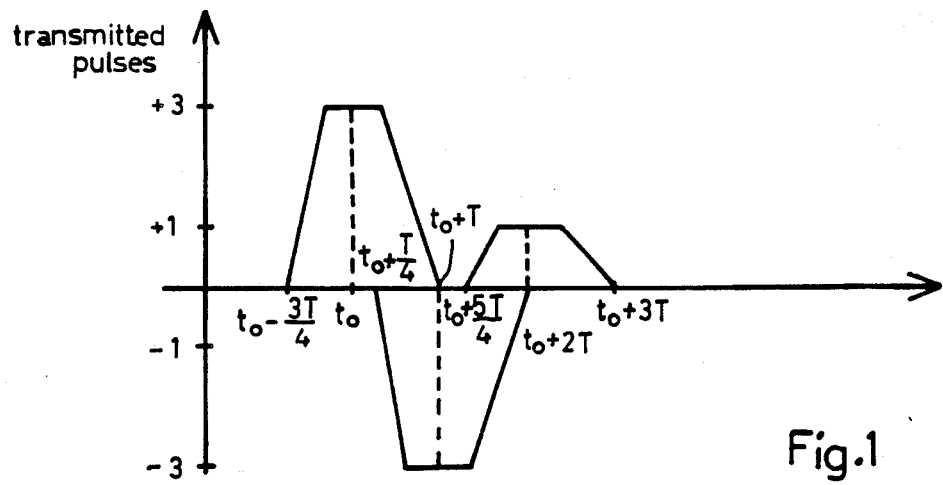
FIG. 1 is a time chart of transmitted pulses.

In FIG. 1 there is illustrated the time chart for the pulses transmitted from the transmitting side of the transmission system, for reception by the system receiver side via a transmission medium, e.g. a cable, In particular, the Figure illustrates so-called "masks" of 2B1Q pulses P1, P2, P3, i.e. each transmitted pulse has a tolerance area which is within the trapezoid-shaped limits of the pulse. In the chart of FIG. 1 the pulse P1 is assumed to have an amplitude of $+3$, pulse P2 $-3$ and pulse P3 $+1$. The pulses P1–P3 correspond here to the binary pair combinations 10, 00 and 11. Each pulse has an extension in time of $T+3T/4$, the pulse P1 starting at the time $t_o-3T/4$, pulse P2 at the time $t_o+T/4$ and pulse P3 at the time $t_o+T+T/4$. The pulses P1–P3 are thus transmitted such as to overlap, i.e. pulse P2 starts before pulse P1 ends. This gives a transmission rate (baud) of $1/T$. Each pulse can assume four levels: $+3$, $-3$, $-1$, $+1$, corresponding to the binary combinations 10, 00, 01 and 11.

Figure 2:
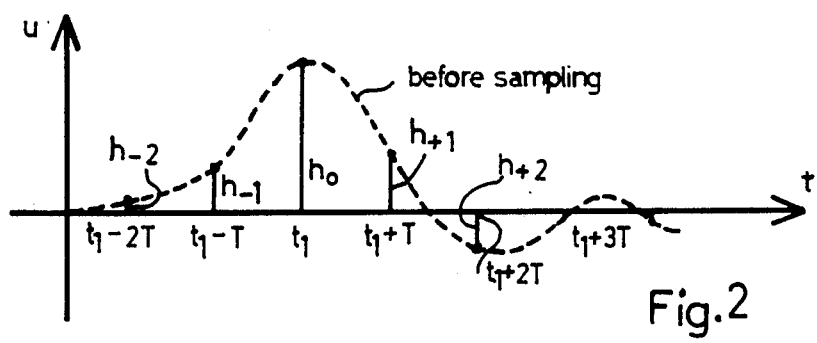
FIG. 2 is a time chart of a received pulse.

As the pulses P1–P3 pass through the transmission medium each pulse will be delayed and distorted. FIG. 2 exemplifies the case for pulse P1 after transmission and when it is about to be received. On the receiver side there is a fixed (non-adaptive) analogue filter for smoothing, which results in the dashed curve of FIG. 2 for a transmitted pulse. At approximately the same instant as the pulse is received, sampling takes place at time $t_1-2T$ at a frequency equal to the bit time T. The first sample is denoted by $h_{-2}$. At $t_1-T$ a second sample $h_{-1}$ is obtained and at $t_2$ a sample $h_o$ is obtained, which is assumed to correspond to the maximum value of the received signal (the remote signal). The delay occurring through the medium will thus be equal to $t_1-t_o$. Subsequent samples are denoted $h_1$, $h_2$, etc. The samples $h_{-2}$ and $h_{-1}$ are the precursors and the samples $h_1$, $h_2$ etc are the postcursors.

To obtain correct detection of transmitted data, it is important that the precursors $h_{-2}$ and $h_{-1}$ can be eliminated so that only the value $h_0$ is detected. In equalizers of the prior art there is a first transversal filter with a plurality of taps, which eliminates the precursors as far as possible, while a second filter eliminates the postcursors. The inventive equalizer also has two filters, but utilizes the fact that in the code used, and apart from $h_0$, the precursor $h_{-1}$ dominates, whereas $h_{-2}$ can be neglected.

Figure 3:
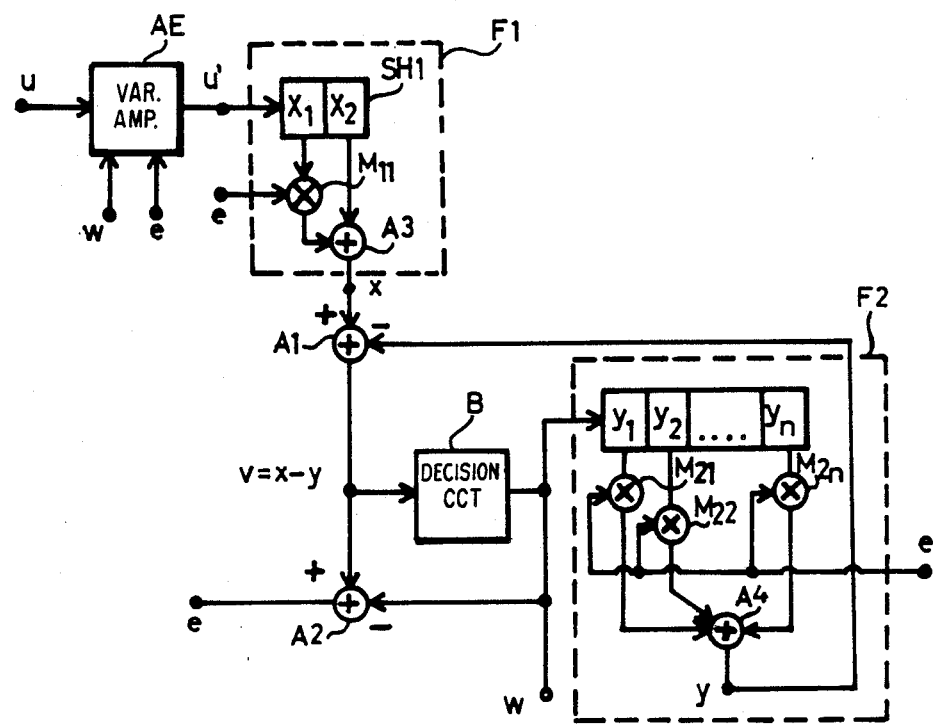
FIG. 3 is a block diagram of an equalizer in accordance with the invention, FIGS. 4a–4b respectively illustrate the appearance of a normalized input signal to the equalizer and its output signal.

FIG. 3 is a block diagram of the equalizer in accordance with the invention.

The incoming remote signal u of FIG. 2, which is assumed to have been smoothed out in a prefilter (not shown) occurs at the input to an amplifier unit AE. This unit has a given, adaptive gain factor, which compensates for the attenuation in the transmission medium. The gain factor adapts in response to detected data w and an error signal e, as described hereinafter, such that the incoming signal u is normalized to a normalized output signal u'.

The equalizer includes a first equalizing filter F1 and a second equalizing filter F2, having a plurality of taps. The output of the first filter F1 is connected to the plus input of a first summing circuit A1, the output of which is connected to a decision circuit B and to the plus input of a second summing circuit A2. Via its output the decision circuit B gives the desired, received data signal and is connected to the input of the second equalizing filter F2. A signal y is obtained from the output of the filter F2, the output being connected to the minus input of the summing circuit A1. Furthermore, the output of the decision circuit B is connected to the minus input of the second summing circuit A2. Both circuits A1 and A2 thus act as difference formers for the signals x, y and the output signal w.

A determination of the incoming signal $v = x - y$ is made in the decision circuit B, this signal being compared with a plurality of threshold values, and for the used 2B1Q code with the levels +3, +1, −1, −3, these values can be +5, +2 from the decision circuit B according to the table:

| Interval v | Output signal w |
| --- | --- |
| +5 < v | +3 |
| +5 > v > +2 | +3 |
| +2 > v > 0 | +1 |
| 0 > v > −2 | −1 |
| −2 > v > −5 | −3 |
| −5 > v | −3 |

There is also obtained an error signal e from the summing circuit A2 to the unit AE according to the table:

| Input signal v | Output signal w | Error signal e | Selected adaption step in AE |
| --- | --- | --- | --- |
| v > +5 | +3 | e > 0 | 0 |
| +5 > v > +3 | +3 | > 0 | −1 |
| +3 > v > +2 | +3 | < 0 | 0 |
| +2 > v > +1 | +1 | > 0 | 0 |
| +1 > v > 0 | +1 | < 0 | +1 |
| 0 > v > −1 | −1 | > 0 | +1 |
| −1 > v > −2 | −1 | < 0 | 0 |
| −2 > v > −3 | −3 | > 0 | 0 |
| −3 > v > −5 | −3 | < 0 | −1 |
| −5 > v | −3 | < 0 | 0 |

The output magnitude w of the decision circuit shall assume one of the quaternary code levels for detection of the input signal U. When the signal of u' is filtered in the equalizer there is obtained an output signal $v = (x - y)$, which is determined by the decision circuit B. The error e denotes in which direction v deviates from the decided value w and is therefore supplied to the amplifier unit AE as well as to multipliers M11 in F1 and M21-M2n in the filter F2.

The first equalizing filter F1 is for eliminating the precursor $h_{-1}$ of the normalized signal u' obtained from the unit AE, and the filter F2 for the postcursors $h_1$, $h_2$, ... in u'. This dividing up of the filters is known. According to the invention, the equalizing filter F1 is only implemented with one tap, i.e. it comprises such as a shift register SH1 having two steps $x_1$ and $x_2$, an adaptive multiplier M11 and a summing circuit A3. The multiplier has a coefficient c, which is updated according to:

$$c = c' - (\Delta c) \times e \times X_1,$$

where
  c' is the preceding value of c
  $\Delta c$ is the step length, i.e. the increase or decrease of c, and
  e = the error constituting the difference between the output signal $(x - y)$ from the summing circuit A1 and the output signal w.

The output signal $(x - y)$ is the signal which has been filtered from the precursors (in the filter F1) and also from the postcursors (in the filter F2). The output signal w is the decision signal derived from $(x - y)$. According to the above, the magnitude e gives the error determining the adaption of the equalizer, apart from the adaption of the unit AE.

Figure 4A:
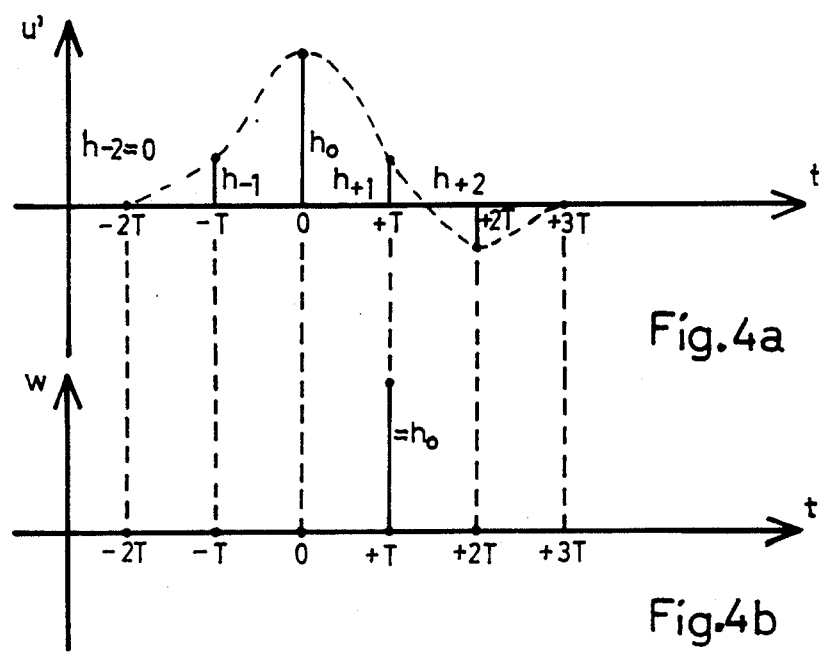

FIG. 4a shows in more detail how the incoming, sampled and normalized signal u' is filtered in the filter F1, for the case where the equalizer has converged, i.e. a sufficient number of samples $h_{-2}$, $h_{-1}$, $h_0$, $h_{+1}$ etc have been processed by the equalizer filters F1, F2 (the error $e \approx 0$). The adaption of the filter F1 means that the multiplier M1 has been set so that the coefficient $c = h_{-1}/h_0$. This is achieved by the so-called LMS algorithm, which minimises the error e and compels the multiplier M11 to assume the above-mentioned value.

1. The instant $-2T$

At this time the shift register SH1 has been charged so that $X_1 = h_{-2}$ and $X_2 = 0$. The output X will thus be 0, since $h_2 \approx 0$.

2. The instant $-T$

The shift register SH1 now contains the values $X_1 = h_{-1}$; $X_2 = h_{-2} \approx 0$. The output X will therefore be:

$$X = h_{-2} + h_{-1}(-(h_{-1}/h_0)) = h_{-1}^2/h_0 \approx 0$$

if $h_{-1} << h_0$. Usually, $h_{-1}$ is between $0.01 h_0$ and $0.1 h_0$, depending on the transmission medium and the prefilter.

3. The instant 0

The shift register SH1 now contains the values $x_1 = h_0$, $x_2 = h_{-1}$ and $X = h_{-1} + h_0(-(h_{-1}/h_0)) = 0$ exactly 4. The instant $+T$ The shift register now contains the values $X_1 = h_{+1}$, $X_2 = h_0$ and $X = h_0 + h_{+1}(-(h_{-1}/h_0)) = h_0 - (h_{-1} \times h_{+1}/h_0) \approx \approx h_0$ if $h_{-1} << h_0$, $h_{+1} << h_0$.

Figure 4B:
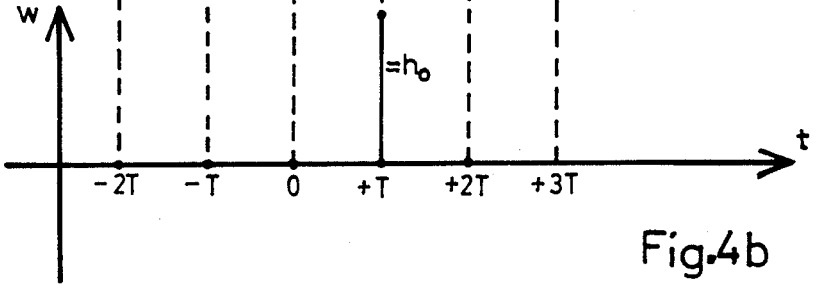

FIG. 4b illustrates the output signal x. It will be seen that the precursor nearest before $h_0$ has been completely eliminated ($-T$). The sample at $-2T$, i.e. two sample intervals before $h_0$ has been modified by the magnitude $<h^2/h_0$, which thus denotes the applicability of the filter F1 in the equalizer. It is further assumed that $h_{-2}$ can be neglectd and that $h_{-1}$ does not exceed about 10% of $h_0$. Under these conditions there is obtained an improvement of the signal-noise ratio by about 20 dB. Practical attempts show that the postcursors $h_{+1}$, $h_{+2}$, etc are also attenuated by the introduction of the filter F1 into the equalizer. The latter usually converges after about 40.000 samples for the longest lines. The coefficient $-(h_{-1}/h_0)$ is the same in the multiplier M11 after the convergence for all possible levels ($+3$, $+1$, $-1$, $-3$) of the input signal $u'$.

I claim:

1. Adaptive equalizer in a receiver of a data transmission system, transmitting overlapping multilevel coded data signals across a transmitting medium having variable attenuation, said receiver including sampling means for sampling a remote signal transmitted across said medium and a controllable amplifier (AE) receiving said remote signal to compensate for the varying attenuation of said transmitting medium, a normalized signal being obtained which includes a dominating sampling component ($h_0$), a precursor ($h_{-1}$) before said component and a postcursor ($h_{+1}$) after said component, a first digital filter (F1) to eliminate said precursor ($h_{-1}$) and a second digital filter (F2) together with a decision means (B) to eliminate said postcursor ($h_{+1}$), said first digital filter having two taps only one of which one has an adaptive equalization coefficient (c) and the other of which has a constant equalization coefficient, means (A2) to provide an error signal (e) from said decision means by comparing input and output signal values for said decision means, and means for applying said error signal (e) to said first digital filter to control said adaptive coefficient (c) and for applying said error signal to said controllable amplifier to control the amplification of said controllable amplifier in dependence on the output signal (w) from said decision means.

2. Equalizer as claimed in claim 1, wherein said first digital filter (F1) includes a shift register (SH1) having two taps to store two sequential sampled values of said normalized signal ($u'$), one of said taps including a controllable multiplier (M11) to multiply the first incoming stored sampled value with said adaptive equalizer coefficient (c) which depends on said precursor ($h_{-1}$) and said dominating component ($h_0$) in dependence on the value of said error signal (e), and adding means (A3) to add the multiplied value thus obtained to the second stored value not being adapted to thereby produce an output quantity (x) in which said precursor is eliminated.

* * * * *